United States Patent [19]

Reinsma et al.

[11] Patent Number: 4,961,667
[45] Date of Patent: Oct. 9, 1990

[54] PIVOT JOINT FOR LOADER LINKAGES AND THE LIKE

[75] Inventors: Harold L. Reinsma, Dunlap; W. Stanley Born, Edelstein, both of Ill.

[73] Assignee: Caterpillar Inc., Peoria, Ill.

[21] Appl. No.: 402,369

[22] Filed: Sep. 5, 1989

[51] Int. Cl.$^5$ .............................................. F16C 11/02
[52] U.S. Cl. ...................................... 403/11; 403/158; 403/288; 414/723
[58] Field of Search ............... 403/157, 158, 161, 162, 403/163, 288, 11; 414/723, 715; 172/273; 37/188, 118 A, 103

[56] References Cited

U.S. PATENT DOCUMENTS

| | | | |
|---|---|---|---|
| 3,554,588 | 1/1971 | Reinsma et al. | 287/100 |
| 3,841,771 | 10/1974 | Shankwitz et al. | 403/163 |
| 3,964,152 | 6/1976 | Shankwitz et al. | 29/427 |
| 3,997,274 | 12/1976 | Iverson | 403/10 |
| 4,022,536 | 5/1977 | Piepho et al. | 403/16 |
| 4,096,957 | 6/1978 | Iverson et al. | 214/145 |
| 4,195,852 | 4/1980 | Roley et al. | 277/92 |
| 4,251,182 | 2/1981 | Schroeder | 403/158 X |
| 4,398,862 | 8/1983 | Schroeder | 414/723 |
| 4,400,898 | 8/1983 | Christensen et al. | 37/118 |
| 4,772,150 | 9/1988 | Horton | 403/39 |

*Primary Examiner*—Andrew V. Kundrat
*Attorney, Agent, or Firm*—O. Gordon Pence

[57] ABSTRACT

A maintenance-free pivot joint is disclosed for mounting a first member of a loader linkage to a second member thereof. The first member is provided with a clevis having a pair of brackets. The pivot joint includes a pivot pin which is pivotally mounted within the second loader linkage member. A first end collar is fixedly secured to one end of the pivot pin of the joint and is slidably mounted to a first one of the pair of brackets. Conversely, a second end collar is slidably mounted on the other end of the pin and fixedly secured to a second of the brackets, but at a preselectable axial position relative to the second member. The positioning of the second end collar at the preselected position allows the joint to accommodate lateral misalignment between the first and second members of the linkage, while maintaining a closely spaced lateral relationship therebetween to eliminate end play and facilitate good sealability.

17 Claims, 2 Drawing Sheets

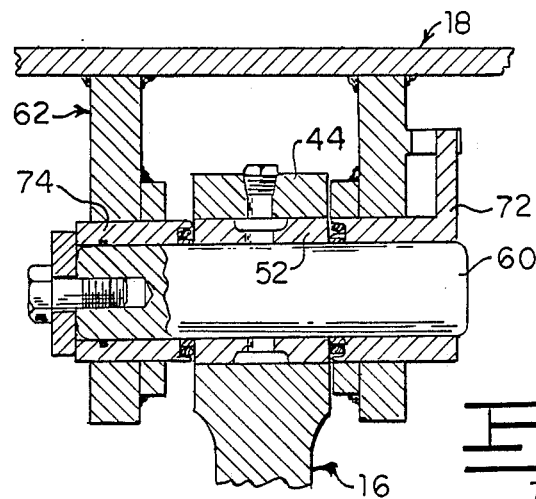
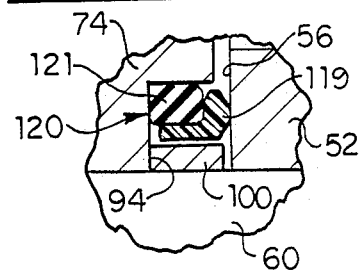
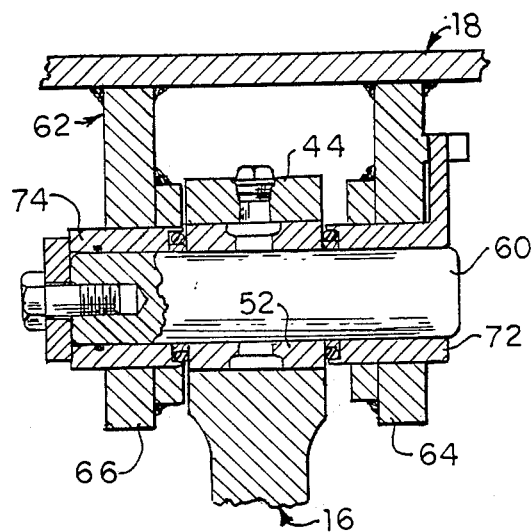

PIVOT JOINT FOR LOADER LINKAGES AND THE LIKE

TECHNICAL FIELD

This invention relates generally to pivot joints for use in connecting the linkage components of a loader vehicle or the like. More particularly, this invention relates to a pivot joint which is capable of being readily disassembled in the field so as to permit the interchange of various tools, such as buckets, on the loader linkage, and which is laterally adjustable so as to facility its alignment with other joints or components of a linkage mechanism during manufacture.

BACKGROUND ART

Pivot joints for loader linkages are normally lubricated with either grease or oil. Oil lubricated pivot joints are typically preferred because they afford greater load carrying capacity than grease lubricated joints, thereby allowing the use of smaller components, and they eliminate the routine maintenance needed to grease the grease lubricated joints on a daily or per shift basis. For this reason, oil lubricated joints are commonly referred to as low maintenance or maintenance-free joints. However, such maintenance-free joints must have an effective sealing system to prevent the loss of the lubricating oil from the joint that would otherwise result in joint failure. One type of maintenance-free pin joint that is commonly used in this industry on front end loaders is a type referred to as a cartridge pin. An example of such cartridge type pin assembly is illustrated in Lowell P. Iverson, et al., U.S. Pat. No. 4,096,957 issued on June 27, 1978. While the cartridge pin joint has proven to be highly satisfactory, it is a welded unit that must be replaced in its entirety when any of its components need replacing.

Another type of oil lubricated pivot joint is that shown in Lee A. Horton U.S. Pat. No. 4,772,150 issued on Sept. 20, 1988. While this joint purports to be readily disassembleable to facilitate repair or replacement of its components, it cannot be axially adjusted to accommodate any misalignment between the various components of the loader mechanism. Those skilled in the art will appreciate that misalignment may cause the joint to bind or place one component into forcible contact with another component. All of this increases friction and wear, which unduly shortens the service life of such pivot joints.

The present invention is directed to overcoming one or more of the problems set forth above.

DISCLOSURE OF THE INVENTION

According to the present invention, a pivot joint is provided for pivotally connecting a first member of a loader mechanism to a second member thereof. The first member includes a pin end of predetermined width. The pivot joint includes a pin which is pivotally received through the pin end of the first member. The second member has a pair of brackets which are spaced laterally apart an enlarged distance sufficiently greater than the width of the pin end of the first member so as to permit a predetermined amount of axial shifting of the first member between the brackets. Apparatus is provided for mounting the opposite ends of the pin to the brackets with the pin end being locatable at any axial position between the brackets and for constraining the axial movement of the pin end at any such axial position so as to prevent any significant end-play movement therebetween. The mounting and constraining apparatus includes a pair of end collars. A first of the end collars is fixedly secured to one end of the pin and slidably mounted to a first of the brackets. A second of the end collars is slidably mounted on the other end of the pin and fixedly secured to a second of the brackets at a preselected axial position based upon the any axial position of the pin end of the first member.

BRIEF DESCRIPTION OF THE DRAWINGS

FIG. 3 is a cross-sectional view similar to, but smaller than, the view of FIG. 2 with one member of the joint shifted to its right-most position.

FIG. 4 is a cross-sectional view similar to FIG. 3, but with the one member thereof shifted to its left-most position.

FIG. 5 is an enlarged, fragmentary cross-sectional view taken generally from within circular section line 5 of FIG. 2 illustrating one of the face seals in greater detail.

BEST MODE FOR CARRYING OUT THE INVENTION

Figure 1:
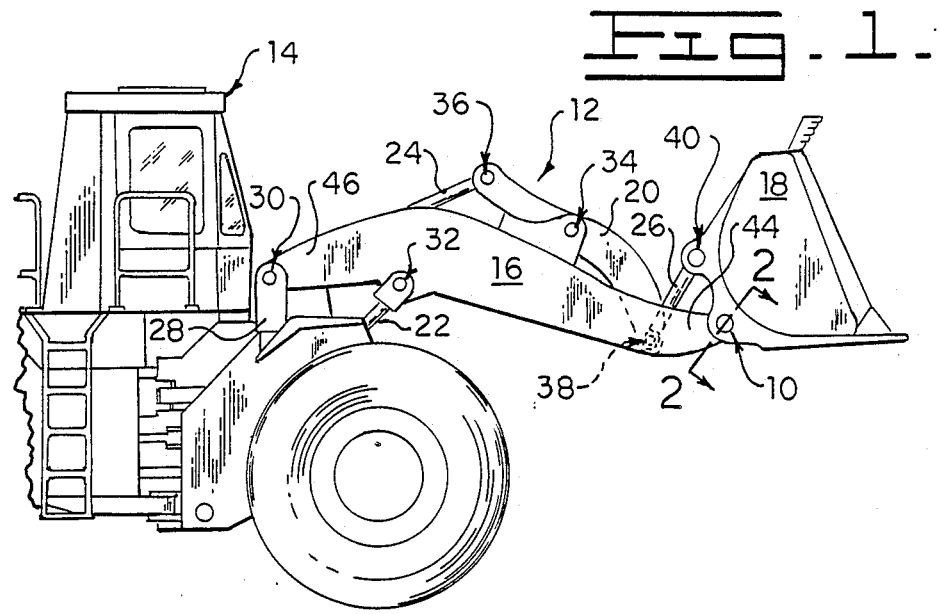
FIG. 1 is a fragmentary side elevational view of a front end loader vehicle equipped with a loader mechanism with a pivot joint embodying the principles of the present invention.

Referring more particularly to the drawings, a pivot joint embodying the principles of the present invention is generally depicted by reference number 10 in FIG. 1 in association with a loader mechanism 12 of a front end loader vehicle 14. As shown in FIG. 1, a typical loader mechanism 12 includes a lift arm 16, a bucket 18, a tilt lever 20, a lift cylinder 22, a tilt cylinder 24, and a link 26. The preceding components are appropriately pivotally connected by numerous pivot joints to their associated components of the loader mechanism. For instance, the bucket 18 is pivotally connected by pivot joint 10 to the forward end of the lift arm 16, while the rearward end of the lift arm is pivotally connected to the loader frame 28 of the vehicle by means of a pivot joint 30. The lift cylinder 22 is connected to the lift arm 16 by means of a pivot joint 32 and to the loader frame by means of a pivot joint, not shown. The tilt lever 20 is pivotally connected at its middle to the lift arm 16 by a pivot joint 34, while one of its ends is connected to the tilt cylinder 24 by means of one pivot joint 36, and its other end is pivotally connected to the link 26 by means of a pivot joint 38. The opposite end of the link 26 is pivotally connected to the bucket 18 by means of a pivot joint 40. Those skilled in the art will appreciate that the above-described components of the loader mechanism, excluding the bucket and loader frame, are typically provided in pairs and that the components depicted in FIG. 1 are only the right-hand ones of those pairs of components.

The present invention will now be described with particular reference to the pivot joint 10 of FIG. 1, it being understood, however, that any of the pivot joints 30–40 could as well be described and that the following description applies to such other pivot joints as well, except for those minor changes as may be necessary to accommodate differences in the components being connected by such other pivot joints.

Figure 2:
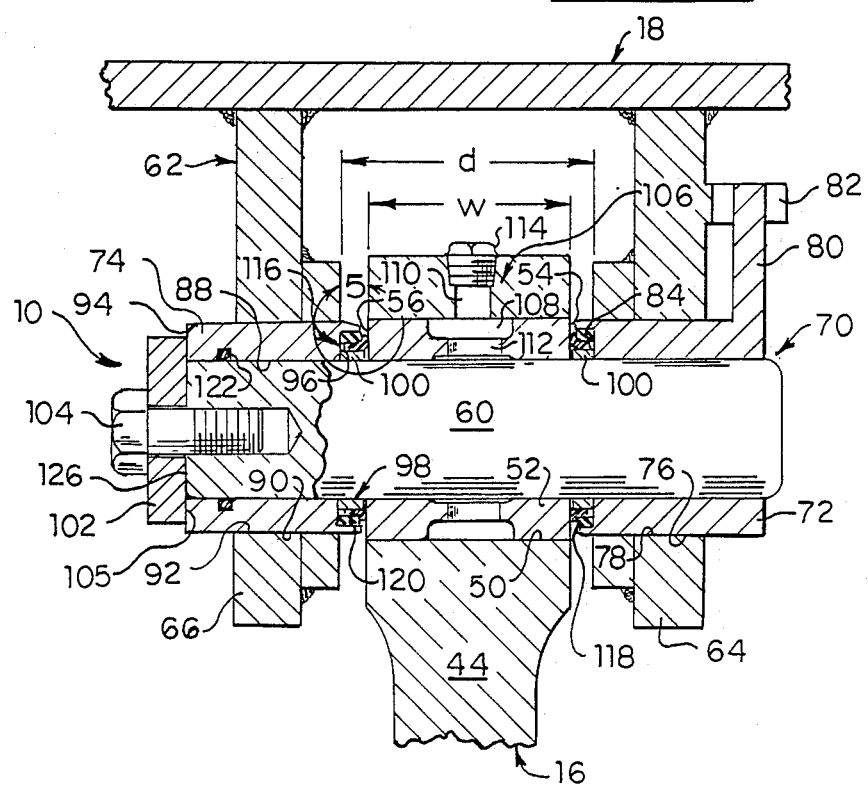
FIG. 2 is an enlarged cross-sectional view taken along line 2—2 of Fig. 1 illustrating the construction of the pivot joint of the present invention.

As shown in FIG. 2, the pivot joint 10 is for pivotally connecting a first member, in the present example lift arm 16, to a second member or bucket 18 of the loader mechanism 12. Lift arm 16 has a pin end 44 which is provided with a bore 50 in which a sleeve bearing 52, preferably of a hardened steel material or the like, is fixably mounted. The bearing 52 has opposite radial end faces 54,56.

A pivot pin 60 is received through and pivotally mounted within the sleeve bearing 52. A clevis 62 is carried on the bucket 18 and includes a pair of brackets, a right-hand bracket 64, and a left-hand bracket 66, for mounting the opposite ends of the pin 60, as will hereinafter be described. The brackets are laterally spaced apart a predetermined distance (d) which is greater than the width (w) of the lift arm end 44. This provides an enlarged gap or gaps between the adjacent sides of the lift arm pin end 44 and its respective bracket to allow the lateral shifting of the end 44 between the brackets 64,66.

Means 7 is provided for mounting the opposite ends of the pin 60 to the brackets 64,66 with the pin end 44 being locatable at any axial position between such brackets and for constraining the axial movement of pin end 44 at any such axial position. Means 70 thereby accommodates lateral misalignment between lift arm pin end 44 and clevis 62 while maintaining a closely spaced lateral relationship between such arm and clevis to prevent any significant end play movement therebetween during operation. Means 70 preferably includes a pair of end collars, a right-hand end collar 72 and a left-hand end collar 74.

The right-hand end collar 72 is fixably secured to the right-hand end of the pin 60 in any suitable manner, such as by press fit or the like. Alternatively, the right-hand end collar 72 and the pin 60 could be integral, i.e., made as a single part, and serve the purposes herein provided. However, there are advantages of having the collar and pin as separate components. One such advantage is that the distance between the end of the pin and the end surface of the collar can be precisely controlled by use of a spacer during assembly and not by machining to close tolerance. The importance of this dimensional relationship will hereinafter be more fully explained. The right-hand end collar 72 has an outer cylindrical periphery 76 which is sized so as to be slidably mounted within a bore 78 of the right-hand bracket 64. The right-hand end collar 72 also includes a radially extending arm 80 which is positionable within and pivotally engageable against a slotted rotation stop 82 provided on the right-hand bracket 64 for preventing the pivotal rotation of the end collar 72 and, in turn, the pin 60 relative to the clevis 62. The inboard end of the end collar 72 is provided with a counterbore having a radial end face 84.

The left-hand end collar 74, on the other hand, has an inner bore 88 sized to be slidably mounted on the other or remote end of the pin 60. Collar 74 also has an outer cylindrical periphery 90 which is sized to have an interference fit with a bore 92 of the left-hand bracket 66 so as to be fixedly secured when mounted within such bore. The left-hand end collar 74 has an outer radial end face 94, as well as an inner radial end face 96 within a similar counterbore at the inner end thereof.

Means 70 also includes means 98 for limiting the axial movement of the lift arm 16 on the pin 60. This is preferably accomplished by a pair of thrust rings 100 which are disposed within the counterbores at the inner ends of each of the collars 72, 74 and in closely spaced abutting relationship between the inner radial end faces 84,96 of the end collars and the respective end faces 54,56 of the sleeve bearing 52. An annular retaining plate or washer 102 is detachably secured to the left-hand end of the pin 60 by means of a bolt 104. The outer periphery of the plate 102 extends beyond the pin 60 so as to engage or abut the outer end face 94 of the left-hand end collar 74 so as to limit the rightward axial movement of the pin 60.

The pivot joint 10 also preferably includes lubrication means generally indicated by reference numeral 106 which includes an oil reservoir 108 about the outer periphery of sleeve bearing 52, a radial passage 110 to permit the filling of the reservoir and a radial passage 112 to communicate the lubricating oil with the mating bearing surfaces of the pin 60 and bearing 52. A plug 114 normally closes off the fill passage 110.

Sealing means 116 are also preferably provided for preventing the loss of lubricating oil from the joint and the ingress of deleterious materials into the joint. Such sealing means preferably includes a pair of primary dynamic axial face seals 118,120, which are disposed within the counterbores of the end collars 72,74, respectively. Seals 118,120 are preferably high quality shear loaded face seals of the type used to seal track joints of track-type tractors. As shown in FIG. 5, seal 120 includes a seal ring 119 having a generally L-shaped cross-section and an annular load ring 121. When load ring 121 is axially compressed, it supplies a force against the seal ring 119 which urges the seal ring into dynamic sealing engagement against the end face 56 of the bearing 52. A more complete description of seals of the type used herein is provided in Robert D. Roley et al., U.S. Pat. No. 4,195,852 issued Apr. 1, 1980 and which is incorporated herein by this reference. It should also be noted that the thrust rings 100 are disposed internally of the seals 118,120 and are effective in maintaining a precise minimum axial dimension for the cavities of the seals, e.g., the minimum distances between the opposing end faces 84 and 54 for seal 118 and between the opposing end faces 96 and 56 for seal 120.

Those skilled in the art will appreciate, however, that the seals 118,120 of the type described herein are only capable of tolerating a limited amount of axial end-play, e.g., the amount of free axial movement afforded in the joint by loosen or gaps between the abutting radial faces of the joint. Typically, such seals are able to tolerate a maximum amount of end-play of between 0.050 to 0.100 inches (1.3 to 2.5 mm). End-play movements greater that this will unload the seal, resulting in the loss of sealing.

Sealing means 116 also includes a static o-ring seal 122 which is disposed within an annular groove within the pin bore 88 of the left-hand end collar 74 to prevent oil leakage from between the end collar and the pin 60.

INDUSTRIAL APPLICABILITY

Of special importance to the present invention is the lateral adjustability which is provided in the pivot joint 10 constructed in accordance with the present invention. In the manufacture of large, massive components, such as those found in the loader mechanisms of large wheel loaders and the like, it is difficult and costly to machine surfaces to within very close tolerances relative to other surfaces or features which are often located a large distance, sometimes up to ten feet (3.05 m) or more, away from the surface being machined.

During the assembly of the loader mechanism 12 at the time of its manufacture, or at such other times as may be necessary, the left-hand end collar 74 may be axially located in the left-hand bracket 66 at any of a multitude of axial positions. This is accomplished by control of the hydraulic press, or other tool, used for pressing the end collar into the bore 92 of the left-hand end bracket 66. The axial location of the end collar is selected based upon the actual lateral assembled position of the clevis 18 relative to arm 16 so as to permit the assemblage of the arm within the clevis without binding or without the face on one side of the arm being in forced contact with an adjacent face of the clevis. It will be understood by those skilled in the art that the actual assembled position of the arm end 44 relative to the clevis 18 may be dictated by the prior attachment of the arm 16 to other components of the loader mechanism, such as to the loader frame 28. Once the axial adjustment of the end collar 74 has been accomplished, the alignment is not affected by subsequent disassembly and reassembly of the joint.

As more clearly depicted in FIGS. 3 and 4, the arm end 44 may be shifted either fully to the right, as shown in FIG. 3, or fully to the left, as shown in FIG. 4, or anywhere in between. This allows the pivot joint 10 to precisely compensate for any misalignment encountered between the lift arm 16 and the clevis 62 due to manufacturing imprecisions or the like. The other pivots joints 30–40 may likewise be aligned so as to align one end of any of the components of the loader mechanism with the other components so that the components can be assembled without forcing such alignment.

The process of constructing the pivot joint 10 and effecting this alignment will now be described. First, the bearing 52 is pre-assembled by pressing it into the lift arm end 44. The first or right-hand end collar 72 is also preassembled by pressing it onto the pin 60. The position of the right-hand end collar 72 is precisely located such that the distance from the end face 84 to the remote end 126 of the pin is, under any tolerance stack-up, always just slightly greater than the total cumulative axial lengths (between contacting surfaces) of the sleeve bearing 52, the thrust rings 100 and the left-hand end collar 74. Such length relationship ensures that when the retainer plate is installed, the components of the pivot joint 10 are closely retained, but without the joint being locked up or being unable to pivot freely as intended. A built-in looseness of from 0.005 to 0.025 inches (0.13 to 0.64 mm) is preferred to account for machine tolerances so as to ensure free pivoting without exceeding the end-play capability of the seals 118,120.

Second, other components of the loader mechanism are assembled. For instance, the rearward end of the lift arm 16 may be connected by pivot joint 30 to the loader frame 28 and the left hand side of the bucket may be connected by a left hand pivot joint (similar to the right hand pivot joint 10,) to the other of the pair of lift arms.

Third, the actual assembled location of the forward lift arm end 44 relative to the clevis 18 is determined. In the example being described, such assembled location will have been previously fixed by the prior assembly of the bucket 18 to the left hand lift arm (not shown).

Fourth, the left-hand end collar 74 is pressed into the left-hand bracket 66 to a selected position based upon the actual assembled location of the lift arm end 44 as determined in the preceding step. For example, the selected position should place the inner face 96 at a location where it is a predetermined distance away from the end face 56 of the bearing 52, such predetermined distance being substantially equal to the length of the thrust ring 100.

Fifth, the face seals and thrust rings can be assembled in their respective counterbores of the collars and the o-ring seal 122 positioned within its groove.

Finally, the assembly of the pivot joint 10 can be completed by placing the lift arm end 44 between the brackets 64,66 with the bearing 52 in axial alignment with the left-hand end collar 74 and then inserting the pin 60 through bearing 52 and left-hand end collar 74 while the right-hand end collar is slidably inserted into right-hand bracket 64. The tightening of bolt 104 pulls the components together through engagement of the retaining plate 102 against the end 94 of the left-hand collar until the retaining plate 102 engages the end 126 of the pin 60. No lock-up of the joint occurs upon tightening of bolt 104 because of the slightly greater length that is provided between end face 84 and the surface 105 of the retainer plate 102, as previously mentioned. However, the joint is effectively secured while a closely retained relationship is maintained which prevents any undue lateral end-play movement of the lift arm end 44 between the brackets 64,66 so as to ensure good sealability of the dynamic face seals 118, 120 and prevent the inadvertent loss of lubricant from the joint 10.

The engagement of the arm 80 with the slotted rotation stop 82 prevents the rotation of the pin 60 and end collar 72 relative to the clevis 18.

A pivot joint constructed in accordance with the present invention not only accommodates misalignment between the clevis 62 the lift arm 16, it also maintains a closely retained lateral tightness in the joint. The former is effective in eliminating any resulting binding of such joint during operation of the loader mechanism, while the latter is effective in minimizing end-play in the joint.

In should also be appreciated that the present joint 10 also reduces the amount of machining that is necessary on the large components of the loader mechanism, as well as the requirement of machining faces on one area of such components to within very critical tolerances with respect to other areas a long distance away. The net result of the above-described construction is a low maintenance pivot joint which is less costly to manufacture, is alignable at assembly to eliminate binding and is disassembleable in the field to facilitate repair of the loader mechanism components or the replacement of one loader implement with another. An additional advantage of the preset pivot joint 10 is that the enlarged gap afforded between the lift arm end 44 and the brackets 64,66 of the bucket allows the lift arms to be more easily positioned or spotted between the brackets by the loader vehicle operator when he is changing buckets in the field.

Other aspects, objects, and advantages of this invention can be obtained from a study of the drawings, the disclosure, and the appended claims.

What is claimed is:

1. A pivot joint for pivotally connecting a first member of a loader mechanism to a second member thereof, comprising:
   said first member having a pin end of predetermined width;
   a pin pivotally received through said pin end of the first member;

said second member having a pair of brackets, said brackets being spaced laterally apart an enlarged distance sufficiently greater than the width of the pin end of said first member so as to permit a predetermined amount of axial shifting of said first member between said brackets; and means for mounting the opposite ends of said pin to said brackets with the pin end being locatable at any axial position between said brackets and for constraining the axial movement of said pin end at any such axial position so as to prevent any significant end-play movement therebetween, said mounting means including a pair of end collars, a first of said end collars being fixedly secured to one end of said pin and slidably mounted to a first of said brackets and a second of said end collars being sized to be slidably mounted on the other end of the pin and fixedly secured to a second of said brackets at a preselected axial position based upon said any such axial position of the pin end of said first member.

2. The pivot joint of claim 1 wherein:

said first member includes a sleeve bearing mounted within said pin end thereof, said sleeve bearing having opposite end faces thereon; and each of said end collars has an inner face opposing a respective one of the opposite end faces of the bearing; and said mounting and constraining means further includes a pair of thrust rings disposed on either side of the bearing between the opposing end faces of the bearing and the end collars.

3. The pivot joint of claim 2 wherein said joint includes means for preventing the inward axial movement of said pin within said second end collar.

4. The pivot joint of claim 3 wherein said second end collar has an outer face and said preventing means includes an annular retainer plate having an end surface which extends beyond the periphery of the pin and is engageable against the outer end face of said second collar, and bolt means for detachably securing the plate to the pin.

5. The pivot joint of claim 2 including lubrication means for lubricating said joint and seal means for preventing the ingress of foreign material into and the egress of lubricant from the joint.

6. The pivot joint of claim 5 wherein said lubrication means includes an annular reservoir formed about the periphery of said bearing, and radial passage means for admitting lubricant into said reservoir and communicating said lubricant between the pin and bearing.

7. The pivot joint of claim 6 wherein said seal means includes an annular groove provided along the interface between the second end collar and the pin and a static o-ring seal disposed within said groove, and a pair of dynamic face seals, each disposed in an annular cavity provided in the inner ends of said collars, said face seals being disposed in dynamic sealing engagement against the respective end face of the bearing.

8. The pivot joint of claim 7 wherein said face seals have a limited end-play capability; and wherein the axial distance between the inner end face of the first end collar and the end surface of the retainer plate is slightly greater than the axial cumulative assembled length of the second end collar, the thrust rings and the bearing so as to prevent joint lock-up, but wherein the difference therebetween is sufficiently less than the end-play capability of the seals to prevent loss of sealability.

9. The pivot joint of claim 8 including means for preventing the rotation of said pin relative to said second member.

10. The pivot joint of claim 9 wherein said means includes a radially extending arm on said first end collar and an axially extending stop on said first bracket positioned to abut said arm to prevent the rotational movement of said first collar.

11. A pivot joint for pivotally connecting a first member of a loader mechanism to a second member thereof, comprising:

said first member having a pin end of a predetermined width;

a pair of axially loaded face seals for sealing said joint, said seals having a maximum end-play limit;

said second member having a pair of brackets, said brackets being spaced apart a distance which is greater than the width of said pin end by an amount substantially exceeding the maximum end-play limit of the seals;

a pin pivotally received through said pin end of said first member;

means for mounting the opposite ends of the pin to said brackets with the pin end being locatable at any axial position between said brackets and for constraining the axial movement of said pin end at any such axial position within a limited range not exceeding the maximum end-play limit of said seals.

12. The pivot joint of claim 11 wherein said mounting and constraining means includes a pair of end collars, a first of said end collars being fixedly secured to one end of said pin and slidably mounted to a first of said brackets and a second of said end collars being slidably mounted on the other end of the pin and fixedly secured to a second of said brackets at a preselected axial position relative to said pin end of said first member.

13. The pivot joint of claim 12 wherein mounting and constraining means includes a retainer plate and means for detachably securing said plate to the pin, said plate having a surface abutting said second end collar to limit inward axial moment of said pin relative to said end collar.

14. The pivot joint of claim 13 including means for preventing the rotation of said pin relative to said second member.

15. The pivot joint of claim 14 wherein said pin end includes a sleeve bearing having opposite end faces, each of said end collars has an inner face disposed in opposing relationship to an adjacent one of said bearing end faces, and said face seals are disposed between respective ones of the opposing faces and in sealing engagement against the adjacent one of said bearing end faces; and wherein said mounting and constraining means includes a pair of thrust rings, each thrust ring being disposed between respective ones of said opposing faces to maintain a minimum axial dimension therebetween.

16. The pivot joint of claim 15 including oil lubrication means comprising an annular reservoir formed about the periphery of said bearing and passage means for admitting oil into said reservoir and for communicating said oil between said pin and bearing.

17. The pivot joint of claim 16 wherein the cumulative length of the second end collar, the thrust rings and the bearing is sufficiently less than the length between said surface of the retainer plate abutting said second end collar and the inner end face of the first end collar so as to prevent the joint from being locked up, but wherein the difference therebetween is sufficiently less than the end-play limit of the seals to prevent the loss of sealability.

* * * * *